United States Patent [19]
Mizobata

[11] Patent Number: 5,299,040
[45] Date of Patent: Mar. 29, 1994

[54] METAL-INSULATOR-METAL TYPE ACTIVE MATRIX LIQUID CRYSTAL DISPLAY FREE FROM IMAGE STICKING

[75] Inventor: Eishi Mizobata, Tokyo, Japan

[73] Assignee: NEC Corporation, Tokyo, Japan

[21] Appl. No.: 714,967

[22] Filed: Jun. 13, 1991

[30] Foreign Application Priority Data

Jun. 13, 1990 [JP] Japan ................ 2-154574
Feb. 26, 1991 [JP] Japan ................ 3-103260

[51] Int. Cl.$^5$ .............................. G02F 1/133
[52] U.S. Cl. ........................ 359/58; 359/60
[58] Field of Search ............ 359/54, 55, 58, 87, 359/60; 307/491

[56] References Cited

U.S. PATENT DOCUMENTS

| 4,523,811 | 6/1985 | Ota ........................ 359/58 |
| 4,861,141 | 8/1989 | Nakazawa ............... 358/58 |

FOREIGN PATENT DOCUMENTS

| 0126518 | 7/1983 | Japan ........................ 359/58 |
| 0105616 | 6/1984 | Japan ........................ 359/57 |
| 0269121 | 11/1986 | Japan ........................ 359/58 |
| 63-303322 | 12/1988 | Japan . |
| 64-76038 | 3/1989 | Japan . |
| 0271728 | 10/1989 | Japan ........................ 359/57 |
| 3-107122 | 5/1991 | Japan . |
| 2091468 | 7/1982 | United Kingdom . |

OTHER PUBLICATIONS

David R. Baraff et al, "The Optimization of Metal-Insulator-Metal Nonlinear Devices for Use in Multiplexed Liquid Crystal Displays", IEEE Transactions on Electron Devices, vol. ED-28, No. 6, Jun. 1981, pp. 736-739.
M. Suzuki et al, "A New Active Diode Matrix LCD Using Off-Stoichiometric SiN$_x$ Layer", Japan Display '86, pp. 72-74.

Primary Examiner—William L. Sikes
Assistant Examiner—Kenneth Parker
Attorney, Agent, or Firm—Sughrue, Mion, Zinn, Macpeak & Seas

[57] ABSTRACT

A metal-insulator-metal liquid crystal display apparatus (i.e., MIM-LCD) which includes a liquid crystal display element having a lower substrate provided with a lead electrode, a pixel electrode and a MIM element connected between the lead and pixel electrodes. The LCD element also includes an upper substrate provided with a transparent counter electrode opposed to the pixel electrode. The MIM-LCD apparatus includes a constant resistor provided in series with the MIM element to prevent changes in the I-V characteristic of the MIM-element from affecting a driving voltage of the display. In an alternative embodiment, the LCD element includes a lower substrate provided with lead and pixel electrodes, an upper substrate provided with a transparent counter electrode opposed to the pixel electrode and a liquid crystal sandwiched between the upper and lower substrates. The LCD element of the second embodiment also includes first and second MIM elements connected in series with first and second constant resistors, respectively. The second MIM element has a higher resistance than the first MIM element and the second constant resistor has a lower resistance than the first constant resistor. The first MIM element and constant resistor are connected between the lead and pixel electrodes and in parallel with the second MIM element and constant resistor, to prevent image sticking.

9 Claims, 12 Drawing Sheets

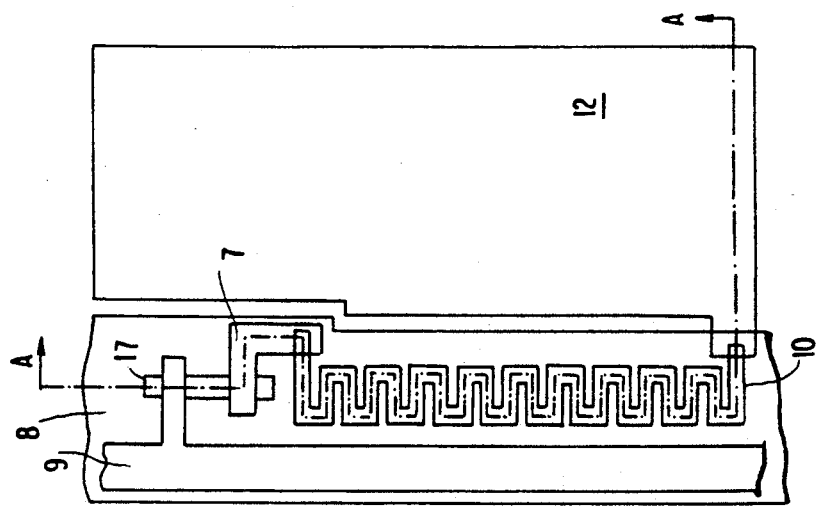
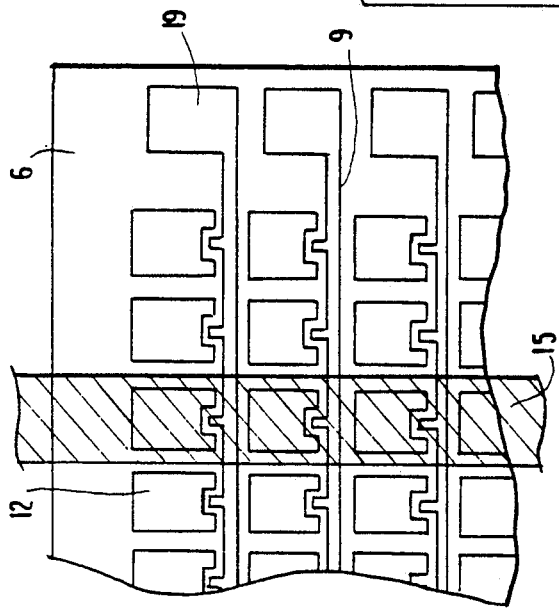
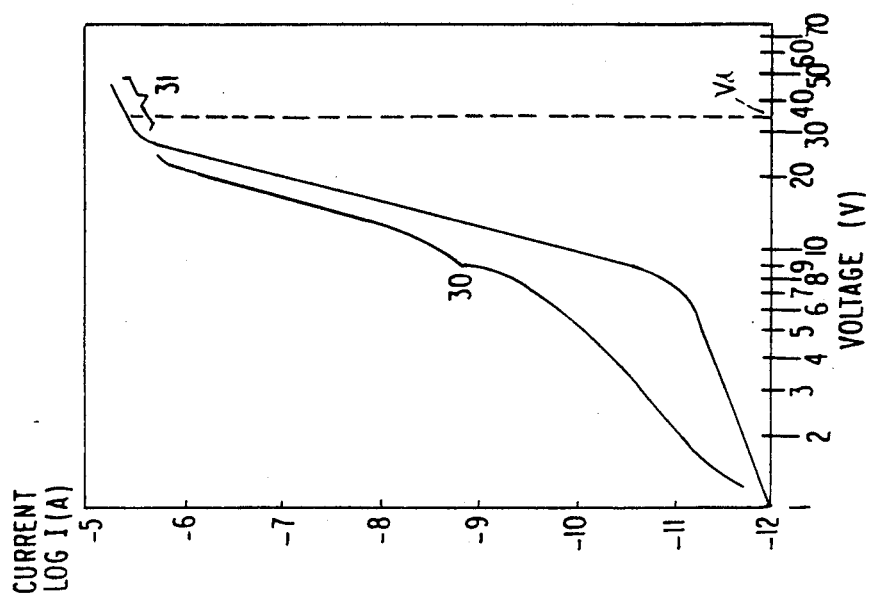

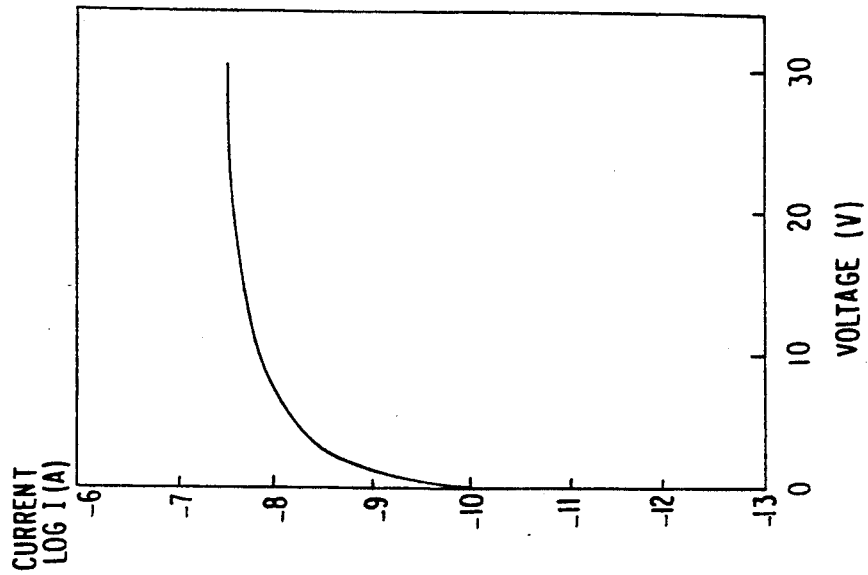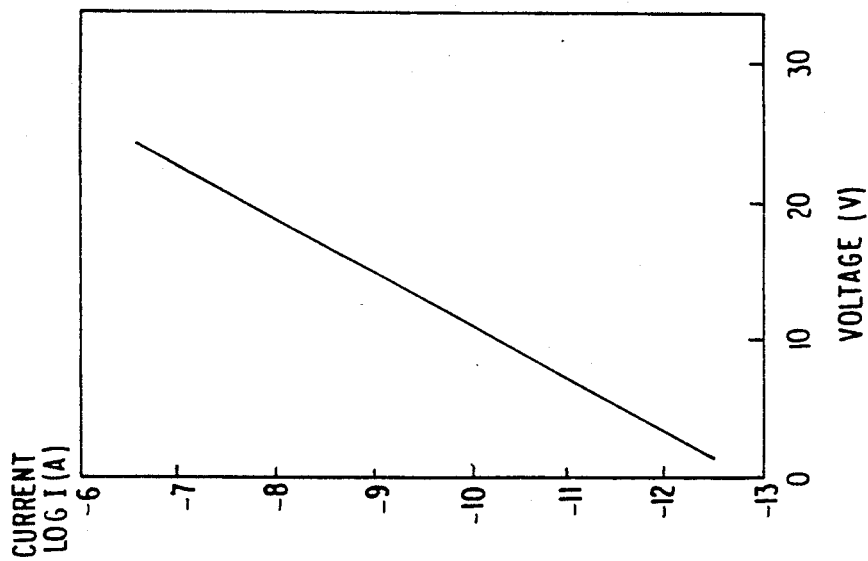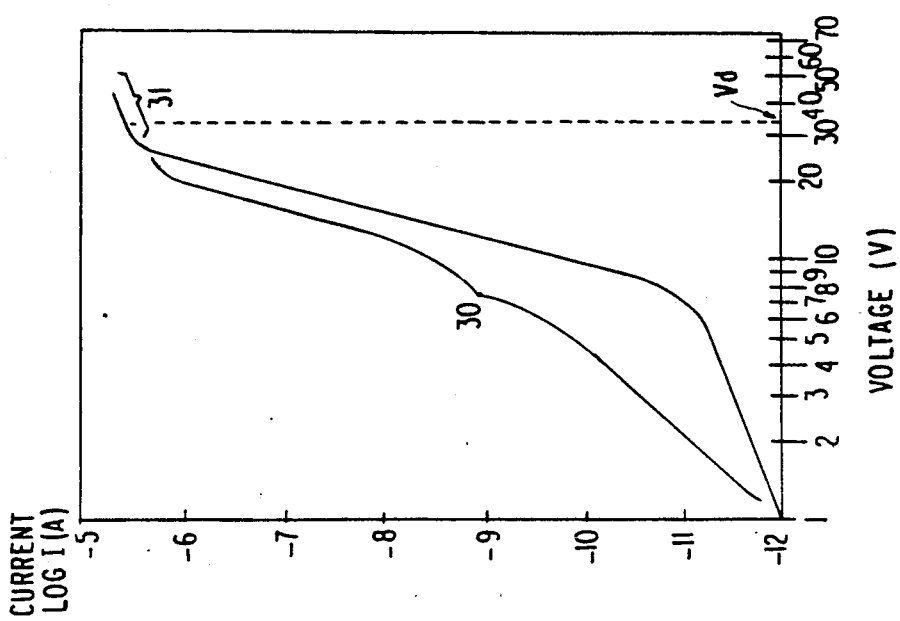

METAL-INSULATOR-METAL TYPE ACTIVE MATRIX LIQUID CRYSTAL DISPLAY FREE FROM IMAGE STICKING

BACKGROUND OF THE INVENTION

1. Field of the Invention

The present invention relates to an active matrix type liquid crystal display (referred to as active matrix type LCD hereinafter) which employs metal-insulator-metal (referred to as MIM hereinafter) elements, and more particularly, to an MIM type active matrix LCD (referred to as MIM-LCD hereinafter) free from image sticking.

2. Description of the Related Art

As the past examples of LCDs that employs MIMs, there may be mentioned those disclosed in D. R. Baraff, et al., "The Optimization of Metal-Insulator-Metal Nonlinear Devices for Use in Multiplexed Liquid Crystal Displays," IEEE Trans. Electron Devices, Vol. ED-28, pp. 736–739 (1981), and S. Morozumi, et al., "Lateral MIM-LCD with 250×240 Pixels," Technical Reports of Television Society of Japan (IPD83-8), pp. 39–44, December, 1983.

In addition, an active matrix LCD which uses silicon nitride of small dielectric constant as a nonlinear resistor for MIM element is disclosed in M. Suzuki, et al. "A New Active Diode Matrix LCD Using Off-Stoichiometric $SiN_x$ Layers," Proceedings of the SID, Vol. 28, pp. 101–104 (1987).

An equivalent circuit per pixel of the prior art MIM-LCD is shown in FIG. 1. A liquid crystal element 5 and an MIM element 18 are connected in series between a lead electrode 9 and a transparent counter electrode 15. The MIM element 18 operates as a nonlinear resistor element. When a voltage is applied for a long time between the lead electrode 9 and the transparent counter electrode 15 in order to drive such an MIM-LCD over a long period of time, there occurs a change in the current-voltage (referred to as I-V hereinafter) characteristic as shown in FIG. 2. In FIG. 2, the solid and the broken lines represent the initial characteristic and the characteristic after drive for 10,000 hours, respectively. With such a change in the I-V characteristic, even when a voltage which is the same as that before the change is applied between the lead electrode 9 and the transparent counter electrode 15, the voltage applied to the liquid crystal 5 becomes different from that before the change, and its display characteristic is accordingly changed. This phenomenon is called image sticking.

SUMMARY OF THE INVENTION

It is, therefore, a major object of the present invention to provide an MIM-LCD which is free from image sticking.

In a liquid crystal display element which has a lower substrate provided with a lead electrode, a pixel electrode, and a metal-insulator-metal element connected between these electrodes, an upper substrate provided with a transparent counter electrode that is placed opposed to the pixel electrode, and a liquid crystal sandwiched between the upper and the lower substrates, the MIM-LCD according to the present invention has a constant resistor provided in series with the MIM element.

The present liquid crystal display element has a lower substrate provided with a lead electrode and a pixel electrode, an upper substrate provided with a transparent counter electrode that opposes the pixel electrode, and a liquid crystal sandwiched between the upper and the lower electrode. The present MIM-LCD apparatus also includes a first metal-insulator-metal element connected in series with a first constant resistor and a second metal-insulator-metal element connected in series with a second constant resistor. The second MIM element has resistance that is higher than that of the first metal-insulator-metal element, and a second constant resistor has a resistance that is lower than that of the first constant resistor. The first metal-insulator-metal element and constant resistor are connected in parallel with the second metal-insulator-metal element and constant resistor and between the lead electrode and the pixel electrode.

BRIEF DESCRIPTION OF THE DRAWINGS

The above and further objects, features and advantages of the present invention will become more apparent from the following detailed description taken in conjunction with the accompanying drawings, wherein:

FIG. 4 is a diagram for I-V characteristic for explaining the MIM-LCD according to the first embodiment of the present invention;

FIG. 5 is a plan view for explaining the first and a second embodiments of the present invention;

FIG. 6 is a partial plan view for explaining the MIM-LCD of the first embodiment of the present invention;

FIG. 9 is the diagram for I-V characteristic of the MIM-LCD shown in FIG. 8;

FIGS. 10 to 16 are I-V characteristic diagrams for explaining the second embodiment of the present invention;

DESCRIPTION OF THE PREFERRED EMBODIMENTS

First Embodiment

Figure 1:
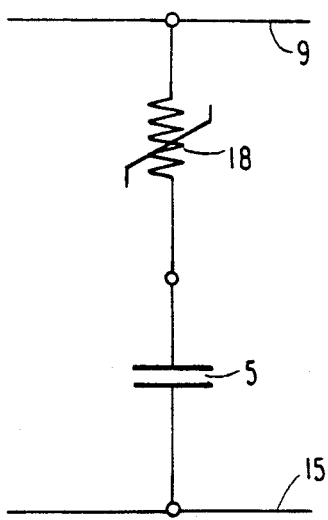
FIG. 1 is an equivalent circuit per pixel of the prior art MIM-LCD.
Figure 3:
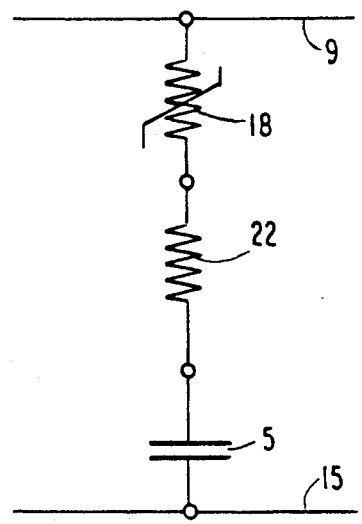
FIG. 3 is an equivalent circuit for explaining the MIM-LCD according to a first embodiment of the present invention.
Figure 2:
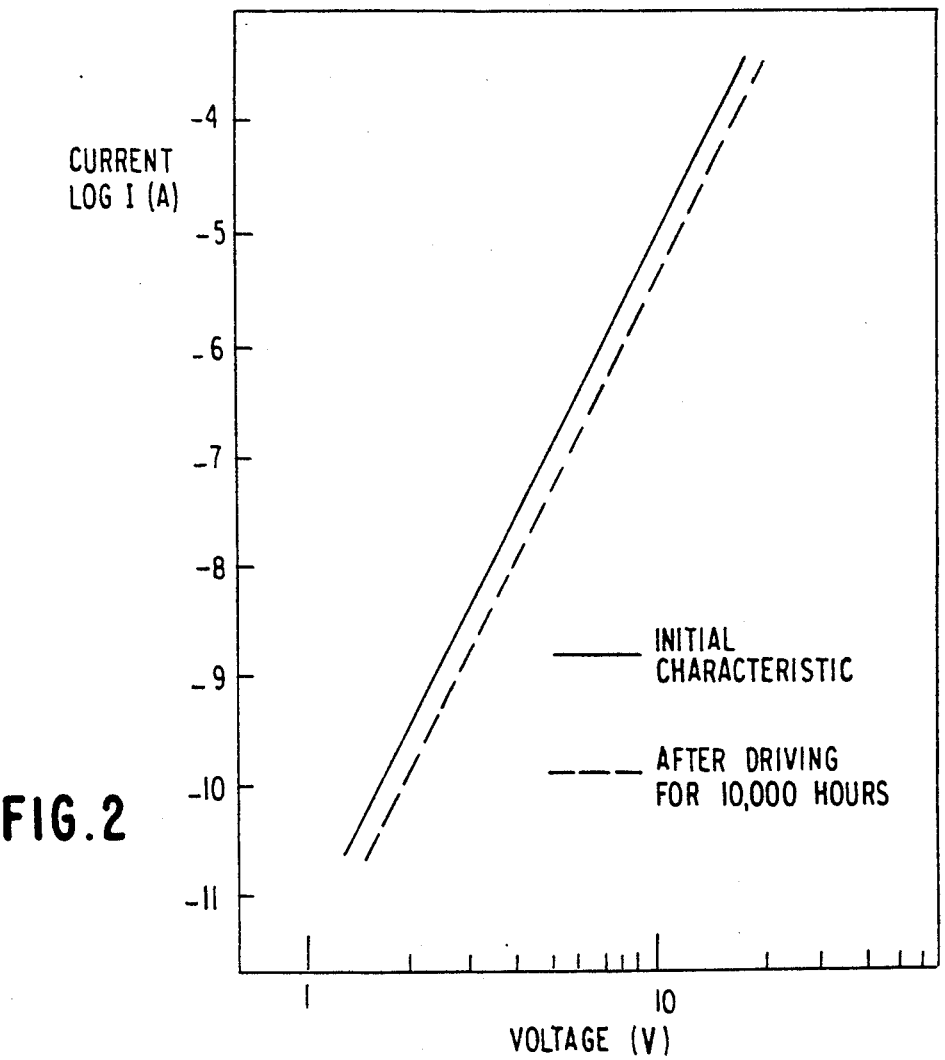
FIG. 2 is a diagram for explaining an I-V characteristic of an MIM element.

Referring to FIG. 3, a constant resistor element 22 is connected between an MIM element 18 and a liquid crystal element 5. The I-V characteristic of the circuit in which the constant resistor element 22 and the MIM element 18 are connected in series is as shown in FIG. 4. For the low values of the voltage V the above-mentioned I-V characteristic is determined by the I-V characteristic of the MIM element 18 (region 30), while for the high values of the voltage V the I-V characteristic is determined by the I-V characteristic of the constant resistance element (region 31). Since the driving voltage Vd for charging the liquid crystal element 5 is chosen to equal a voltage in the region 31 and the driving voltage is terminated before the voltage across the circuit of the MIM element 18 and the resistor element 22 is lowered into the region 30, the charging voltage supplied to the liquid crystal element 5 will not change even though the I-V characteristic of the MIM element 18 is changed. Further the display characteristic of the liquid crystal will not change either since the driving voltage is maintained in the region 31.

Further, the driving voltage that is applied to the liquid crystal element 5 is determined not by the I-V characteristic of the MIM element 18 but by the I-V characteristic of the constant resistor element 22, so that the nonuniformity of display within the panel can also be improved. This is due to the following reasons. The variation in the I-V characteristic of the MIM element 18 is generated due mainly to the fluctuation in its film thickness. Since it is difficult to restrain the variation of the film thickness within the panel to within a certain predetermined range, it is accordingly difficult to improve the uniformity of display within the panel. On the other hand, the variation in the I-V characteristic of the constant resistor element 22 is mainly due to the fluctuation in the accuracy of the length and width, namely, the accuracy of the planar processing of the element 22. According to the presently available lithography technology it is relatively easy to confine the fluctuation in the planar dimensions within the panel to below predetermined values. Accordingly, it is possible to improve the nonuniformity of display within the panel by controlling the variation of the constant resistor element 22 within the panel.

Figure 7:
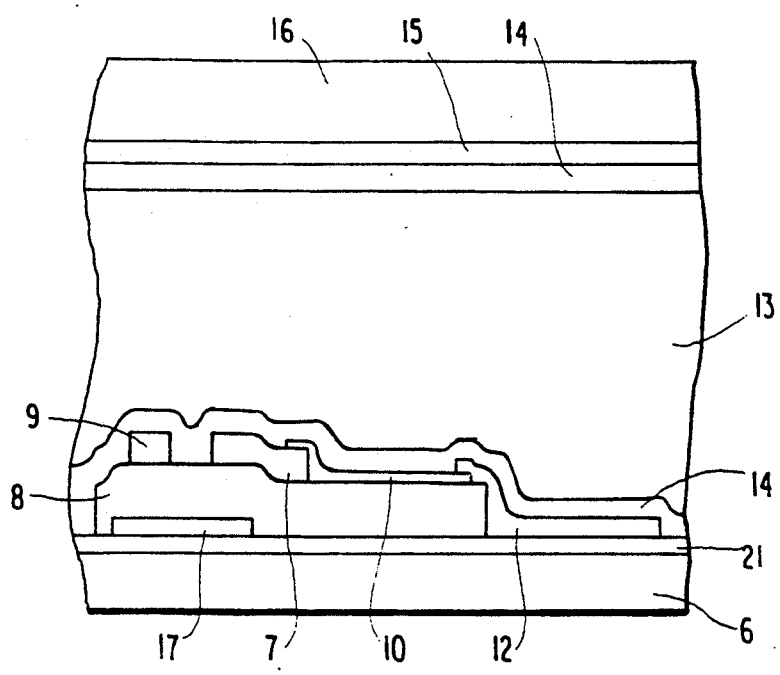
FIG. 7 is a sectional view taken along the AA line in FIG. 6.

Next, referring to FIGS. 5 to 7, the structure and the method of fabrication of the MIM-LCD according to the first embodiment of the present invention is described.

Referring to FIG. 5, pixels 12 are arranged in a matrix form on a lower glass substrate 6. The pixels of each row are respectively connected to a lead electrode 9 for each row via MIM elements (not shown), and one end of the lead electrode 9 is connected to a terminal part 19. The terminal part 19 is connected to a driver circuit (not shown). Over the pixels of each column there is provided a transparent counter electrode 15 that is placed on an upper glass substrate 16.

Referring to FIGS. 6 and 7, the lower glass substrate 6 is coated with a glass protective layer 21 of $SiO_2$ or the like. Since the protective layer 21 is not absolutely necessary it may be omitted if so desired. Next, a Cr layer with thickness of 300 to 600 Å is formed as a lower electrode, and an MIM element connecting electrode 17 which is to become the lower electrode of the MIM element is formed by the ordinary photolithography.

Next, a silicon nitride layer with thickness of 800 to 2000 Å is formed as a nonlinear resistor 8 by a glow discharge decomposition method that uses $SiH_4$ gas and $N_2$ gas. Following that, a Cr layer with thickness of 1000 Å is formed, and a lead electrode 9 and a constant resistor connecting electrode 7 are formed through patterning by the photolithography method. Then, the silicon nitride layer is patterned by photolithography.

Next, a Ta layer with thickness of about 100 Å is formed, and a constant resistor 10 is formed by patterning it in a slender meandering shape by photolithography. Then, an indium tin oxide (referred to as ITO hereinafter) film is formed as a pixel electrode 12 by patterning.

Further, an ITO film is formed on the upper glass substrate 16, and patterned it to form a transparent counter electrode 15. The lower glass substrate 6 and the upper glass substrate 16 are subjected to an orientation treatment, then laminated via a spacer such as glass fiber, and sealed with an ordinary epoxy adhesive. The thickness of the cell is set at 5 $\mu$m.

Then, a TN type liquid crystal is injected to form a liquid crystal layer 13. An MIM-LCD is completed by sealing the liquid crystal layer 13.

Although the nonlinear resistor 8 is constructed by using silicon nitride in the present embodiment, it may be constructed by using silicon carbide, silicon oxide, or the like.

In an MIM element fabricated as in the above, the nonlinear resistor 8 is formed on the MIM element connecting electrode 17, and on top of the nonlinear resistor 8 there are formed the lead electrode 9 and the constant resistor connecting electrode 7 on both ends of the connecting electrode 17 by perpendicularly crossing the connecting electrode 17 so as to have equal crossing areas with the connecting electrode. Accordingly, by connecting a first MIM element consisting of the lead electrode 9, the nonlinear resistor 8 and the MIM element connecting electrode 17, and a second MIM element consisting of the constant resistor connecting element 7, the nonlinear resistor 8 and the MIM element connecting electrode 17, back-to-back in series between the lead electrode 9 and the constant resistor connecting electrode 7, it is possible to remove asymmetry based on the polarity change. Further, the constant resistor connecting electrode 7 is connected to the pixel electrode 12 through the constant resistor 10. As a result, there is obtained a structure that connects in series two MIM elements and the constant resistor 10 and the pixel electrode 12.

Figure 8:
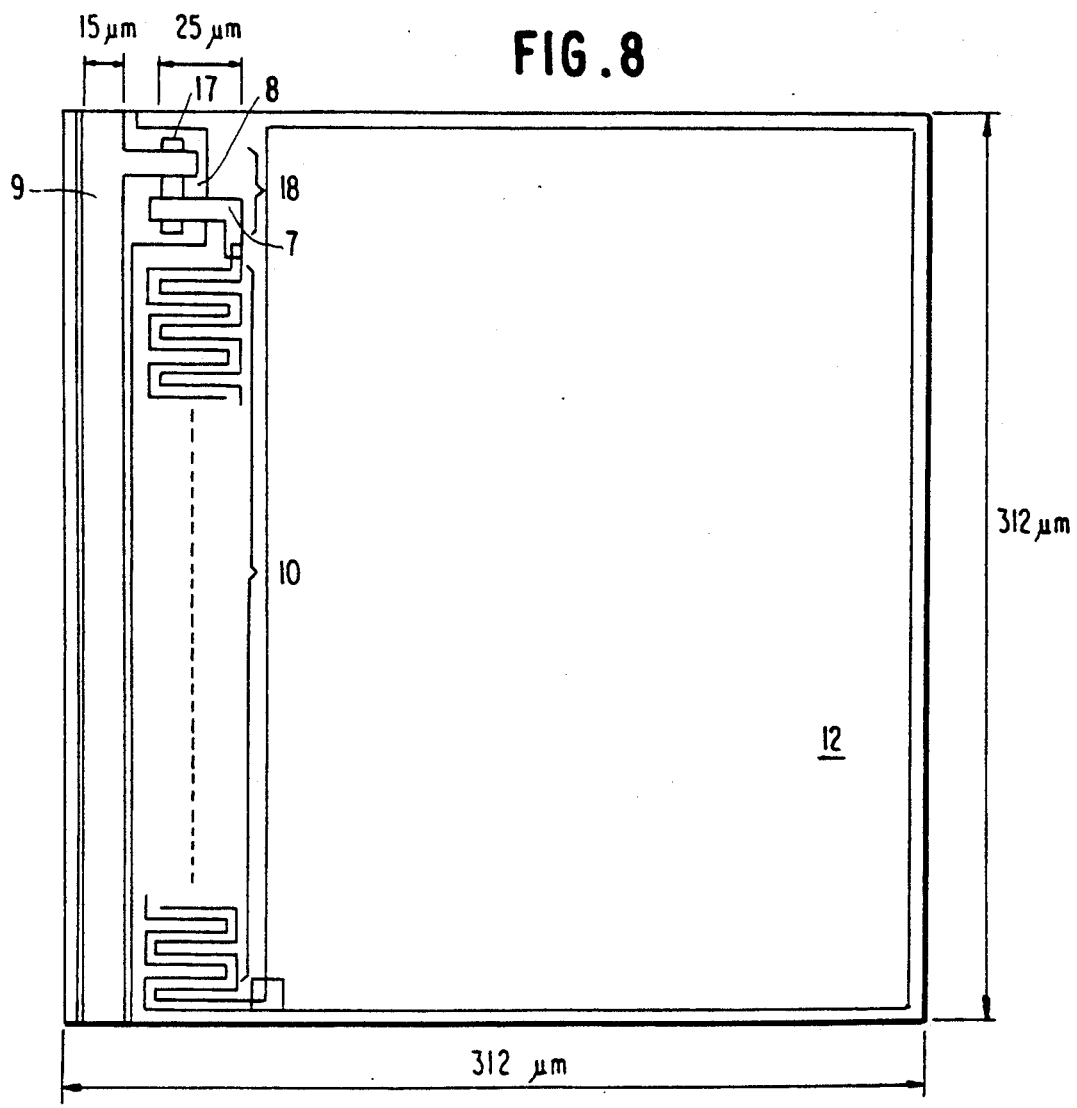
FIG. 8 is a plan view for explaining the MIM-LCD in which Sb-doped $SnO_2$ is used as the constant resistor, presented as an application of the first embodiment of the present invention.

Next, an MIM-LCD is fabricated by switching the material for the constant resistor 10 from Ta to Sb-doped $SnO_2$ (usually referred to as a NESA film). Since the basic structure of the MIM-LCD obtained is the same as that shown in FIGS. 5 to 7, its plan view alone is shown in FIG. 8. An Sb-doped $SnO_2$ film having resistivity of $5\times 10^{-2}$ $\Omega$.cm is formed to a thickness of 100 Å by an evaporation method, then a constant resistor 10 with resistance $1.1\times 10^7$ $\Omega$ is formed by patterning the $SnO_2$ film so as to have a line width of 4 $\mu$m and a length of 883 $\mu$m. The nonlinear resistor 8 is formed of a silicon nitride film of thickness 1100 Å. The I-V characteristic of the series connection of the MIM element 18 and the constant resistor 10 is as shown in FIG. 9. If the driving voltage Vd of the MIM-LCD is assumed to be 33 V, then it means that the I-V characteristic of the MIM-LCD is to use the region 31 which is dominated by the I-V characteristic of the constant resistor 10. Therefore, the voltage that is applied to the liquid crystal element is not changed and hence the display characteristic of the liquid crystal is not changed either even though there occurs a change in the I-V characteristic of the MIM element itself.

Namely, if the present embodiment is applied, the I-V characteristic in the range of the driving voltage of the MIM-LCD as a whole will not be changed even when the I-V characteristic of the MIM element changes. Consequently, the display characteristics of the liquid crystal is scarcely changed even though the I-V characteristic of the MIM element itself is changed.

Second Embodiment

Figure 17:
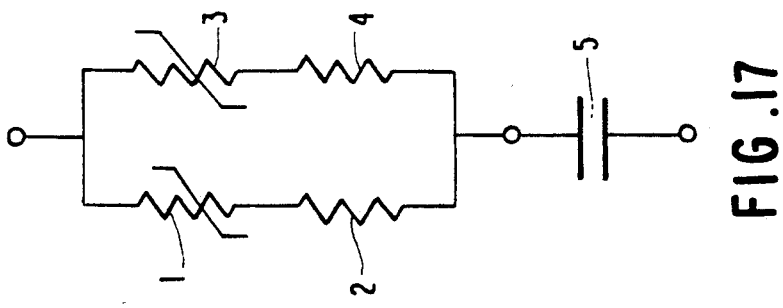
FIG. 17 is an equivalent circuit diagram for explaining the MIM-LCD of the second embodiment of the present invention.

The MIM-LCD second embodiment of the apparatus will be described based on FIGS. 10 to 16, which show the I-V characteristics of various MIM elements and constant resistors. FIG. 17 illustrates an equivalent circuit for one pixel of the MIM-LCD apparatus.

Figure 14:
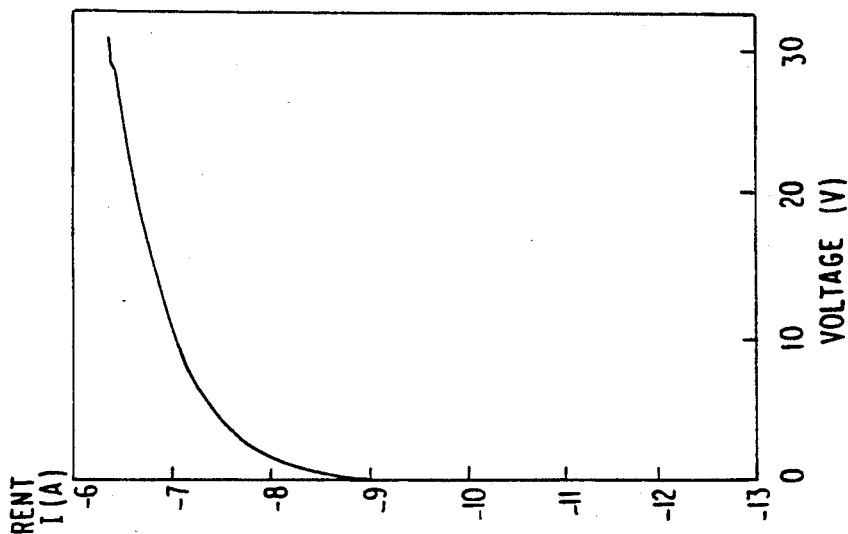
Figure 13:
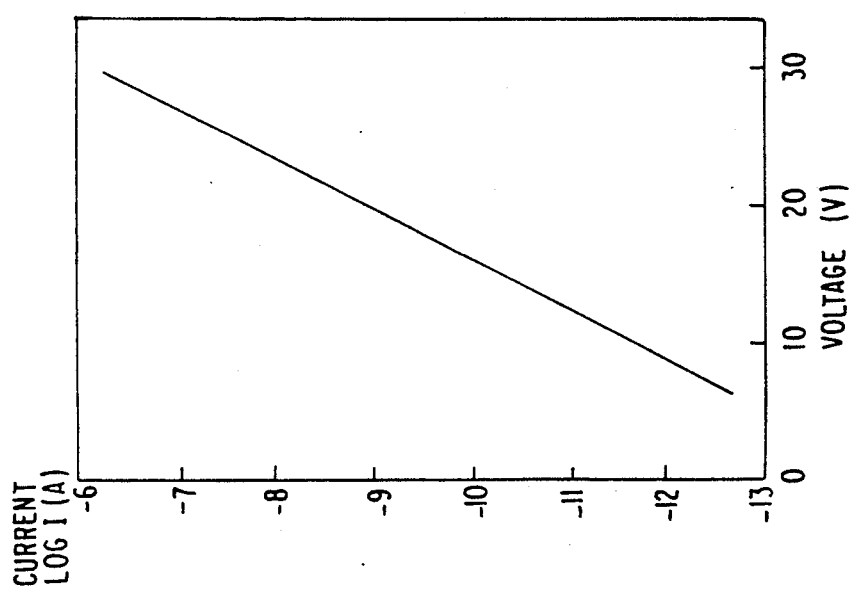
Figure 12:
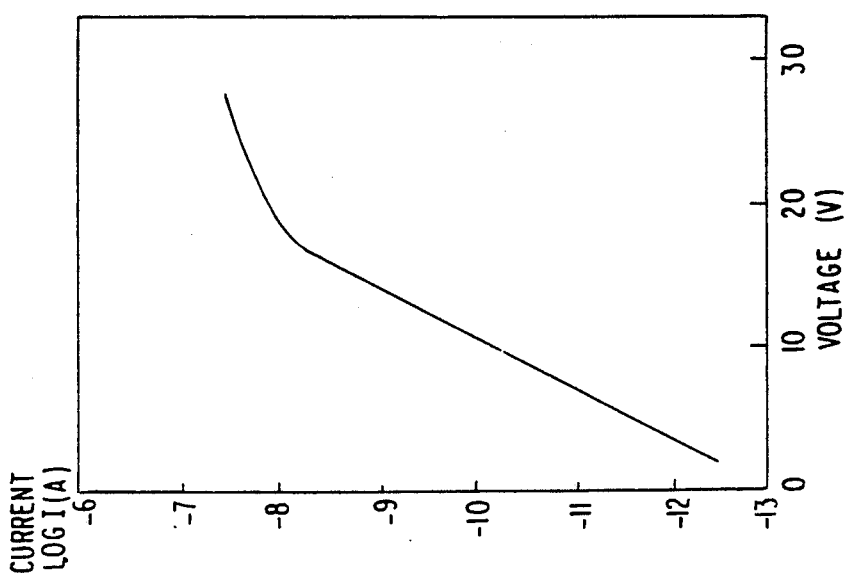
Figure 16:
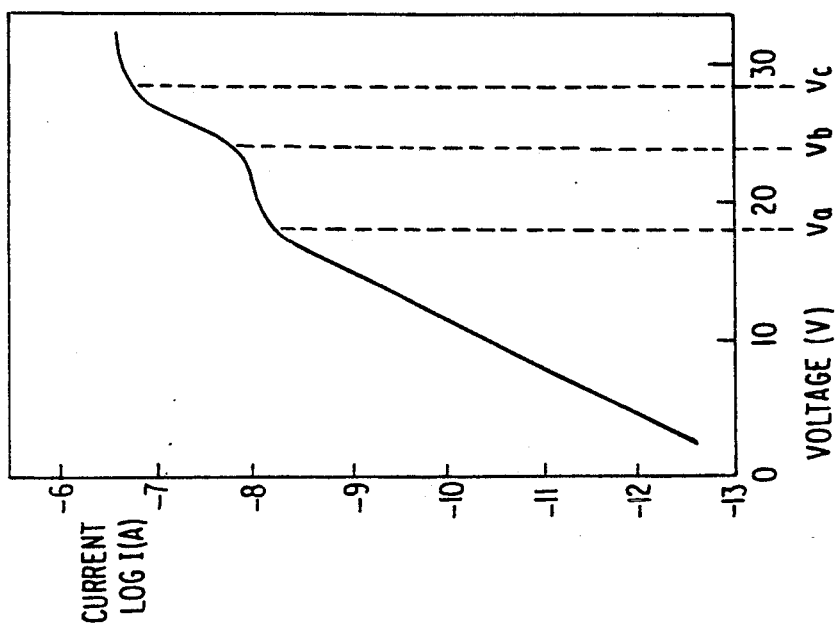
Figure 15:
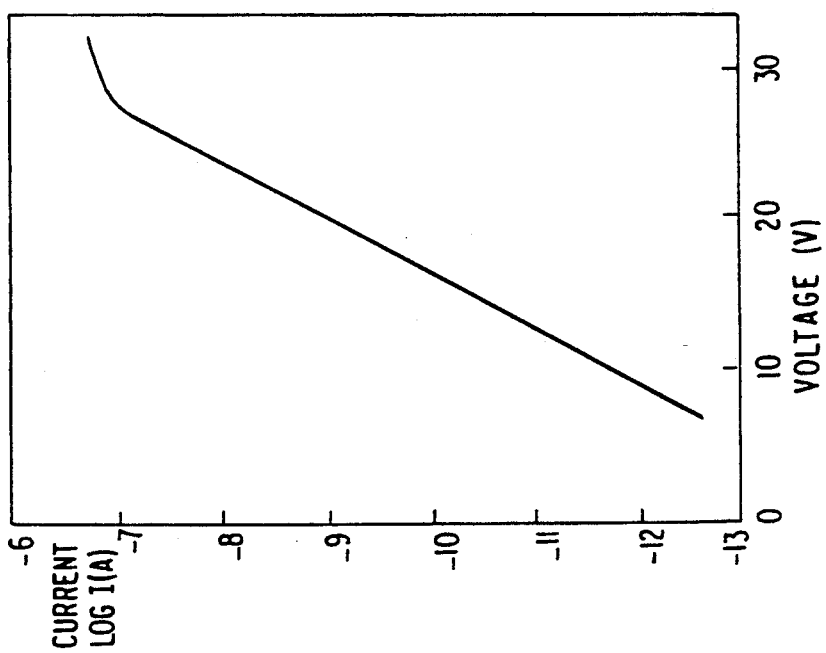
Figure 18:
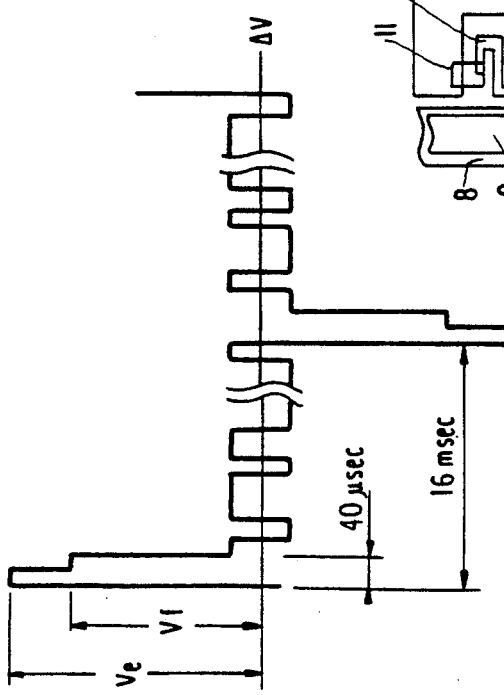
FIG. 18 is a waveform diagram for driving the MIM-LCD of the second embodiment of the present invention.

When two resistors are connected in series, the resistance of the resultant system becomes approximately equal to the resistance of the higher of the two resistors, whereas when they are connected in parallel, the resistance of the resultant system becomes approximately equal to the resistance of the lower of the two resistors. The I-V characteristic of a system obtained by connecting in series a first MIM element 1 having an I-V characteristic as shown in FIG. 10 and a first constant resistor 2 having an I-V characteristic as shown in FIG. 11 becomes as shown in FIG. 12. The I-V characteristic of a system obtained by connecting in series a second MIM element 3 having an I-V characteristic as shown in FIG. 13 and a second constant resistor 4 having an I-V characteristic as shown in FIG. 14 becomes as shown in FIG. 15. An equivalent circuit for a nonlinear resistance element formed by connecting in parallel two sets of serially-connected MIM element and constant resistor is as shown in FIG. 17, and its I-V characteristic is as shown in FIG. 16. In this I-V chart, the regions of OV-Va, Va-Vb, Vb-Vc and above Vc are determined by the I-V characteristics of the first MIM element 1, first constant resistor 2, second MIM element 3 and second constant resistor 4, respectively. When the gradation display is performed by pulse width modulation, the driving waveform is as shown in FIG. 18. The liquid crystal is turned on when the voltage is Ve, and is turned off when it is Vf. The gradation is controlled by changing the width of the pulse that is applied between the lead electrode 9 and the transparent counter electrode 15. The resistances of the MIM elements and the constant resistors are set such that the voltages of Ve and Vf of the driving waveform are above Vc and within the range of Va to Vb, respectively. Further, the driving voltages Ve and Vf are also set to terminate before the voltage across the circuit of FIG. 17 drops below Vc and before the voltage across the same circuit drops below Va. By setting the resistances and the voltage termination times in the noted manner, the I-V characteristic in the vicinity of the driving voltage Ve and Vf is prevented from changing, even if the I-V characteristics of the first MIM element 1 and the second MIM element 3 are changed. Accordingly, the changes in the I-V characteristic of the MIM elements does not appear as image stickings in the display of the pixel.

Figure 19:
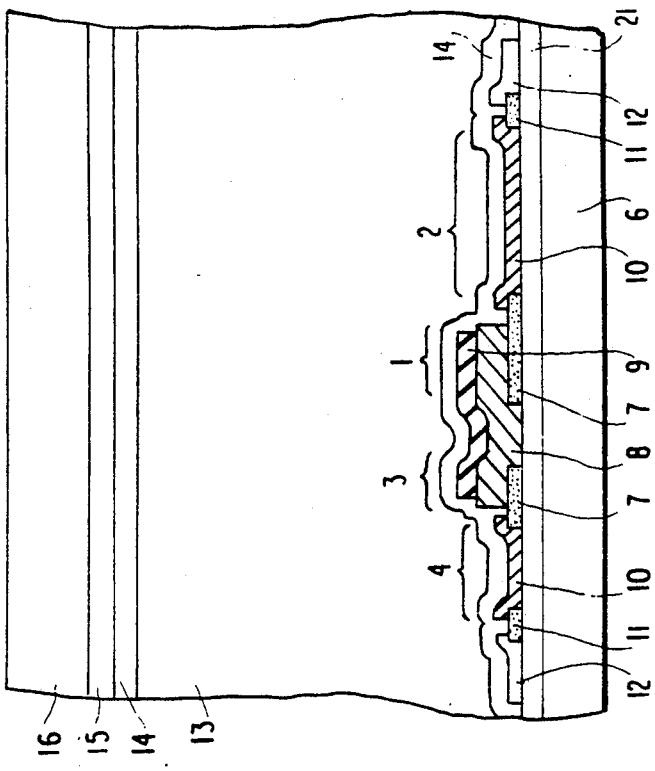
FIG. 19 is a sectional view of the MIM-LCD obtained as a first application of the second embodiment of the present invention.
Figure 20:
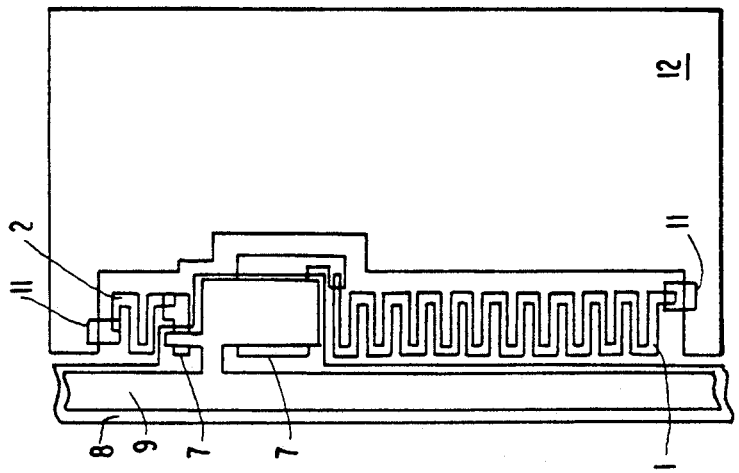
FIG. 20 is a plan view of the MIM-LCD obtained as the first application of the second embodiment of the present invention.

FIGS. 19 and 20 are a sectional view and a plan view on the surface of the lower substrate, respectively, of one pixel of the MIM-LCD obtained as a first application of the present embodiment. The lower glass substrate 6 is coated with a glass protective layer 21 made of $SnO_2$ or the like. Since this protective layer is not indispensable it may be omitted. Next, a Cr film with thickness of 300-600 Å or so is formed as a lower electrode, and a constant resistor connecting electrode 7 which become the lower electrodes of the MIM element and pixel connecting electrodes 11 are formed by the ordinary photolithography. Then, an MIM element 8 of silicon nitride layer with thickness of 800-2000 Å or so is formed by a glow discharge decomposition method that uses $SiH_4$ gas and $N_2$ gas, and a first MIM element 1 and a second MIM element 3 are formed by patterning the silicon nitride layer. Following that, a Cr film with thickness of 1000 Å is formed as an upper electrode, and a lead electrode 9 is formed through patterning of the Cr film by a photolithography method. In this process the area of the overlapped portion of the lower electrode and the upper electrode which represents the element area of the second MIM element 3 is so adjusted to be 1/40 to 1/20 of the element area of the first MIM element 1. Further, a Ta film with a thickness of about 100 Å which is to become the constant resistors 10 are formed, and a first constant resistor 2 and a second constant resistor 4 which has a width equal to, and a length 1/10 to 1/5 of, those of the first constant resistor 2, patterned in a slender and meandering shape are formed by a photolithography method. Pixel electrodes 12 are formed by patterning an ITO film.

An ITO film is formed on an upper glass substrate 16, and a transparent counter electrode 15 is formed by patterning the film. The lower glass substrate 6 and the upper glass substrate 16 are subjected to an orientation treatment to form oriented films 14, laminated via a spacer such as glass fiber, then sealed with an ordinary epoxy adhesive. The thickness of the cell is set to be 5 $\mu$m.

Then, a TN type liquid crystal is injected to form a liquid crystal layer 13. An MIM-LCD is completed by sealing the liquid crystal layer. After a driving of the MIM-LCD for 10,000 hours there was observed no image sticking.

Figure 21:
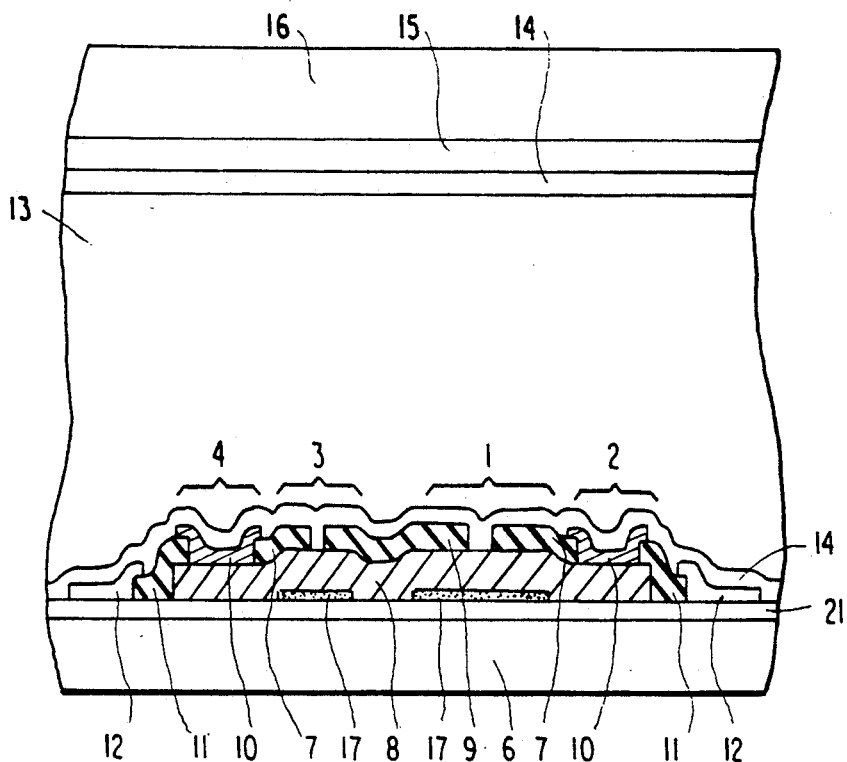
FIG. 21 is a sectional view of the MIM-LCD obtained as a second application of the second embodiment of the present invention.
Figure 22:
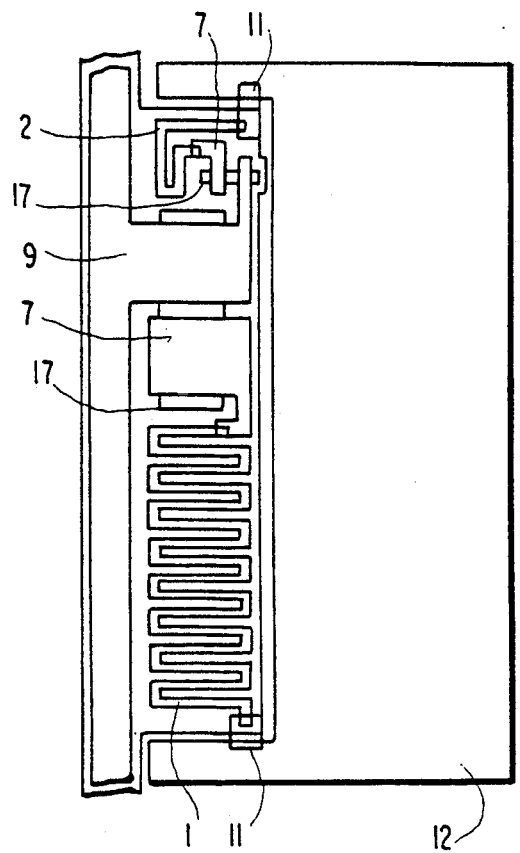
FIG. 22 is a plan view of the MIM-LCD obtained as the second application of the second embodiment of the present invention.

FIGS. 21 and 22 are a sectional view and a plan view on the lower substrate surface, respectively, of one pixel of the MIM-LCD obtained as a second application of the present embodiment. The lower glass substrate 6 is coated with a glass protective layer 21 made of $SiO_2$. This protective layer 21 may be omitted since it is not absolutely necessary. Next, a Cr film with thickness of 300 to 600 Å or so is formed as a lower electrode, and MIM element connecting electrodes 17 which are to become the lower electrodes of the MIM element are formed by an ordinary photolithography method. Next, an MIM element 8 made of a silicon nitride layer with thickness of 800 to 1500 Å or so is formed by a glow discharge decomposition method that uses SiH$_4$ gas and N$_2$ gas, and a first MIM element 1 and a second MIM element 3 are patterned by an ordinary photolithography method. Following that, a Cr film with thickness of 1000 Å is formed as an upper electrode, and a lead electrode 9 pixel connecting electrodes 11 and constant resistor connecting electrodes 7 are patterned by an ordinary photolithography method. At this time, the area of the overlapped portion of the lower electrode and the upper electrode which forms the element area of the second MIM element 3 is adjusted to be 1/40 to 1/20 of the element area of the first MIM element 1. Further, a Ta film with thickness of about 100 Å which becomes the constant resistors 10 is formed, and a constant resistor 2 and a second constant resistor 4, which has a width equal to, and a length 1/10 to 1/5 of, those of the first constant resistor 2, patterned in a slender and meandering shape are formed by a photolithography method. Pixel electrodes 12 are formed by patterning an ITO film.

An ITO film is formed on an upper glass substrate 16, and a transparent counter electrode 15 is formed by patterning the film. The lower glass substrate 6 and the upper glass substrate 16 are subjected to an orientation treatment to form oriented films 14, laminated via a spacer such as glass fiber, then sealed with an ordinary epoxy adhesive. The thickness of the cell is set to be 5 μm.

Then, a TN type liquid crystal is injected to form a liquid crystal layer 13. An MIM-LCD is completed by sealing the liquid crystal layer. After a driving of the MIM-LCD for 10,000 hours there was observed no image sticking.

Figure 23:
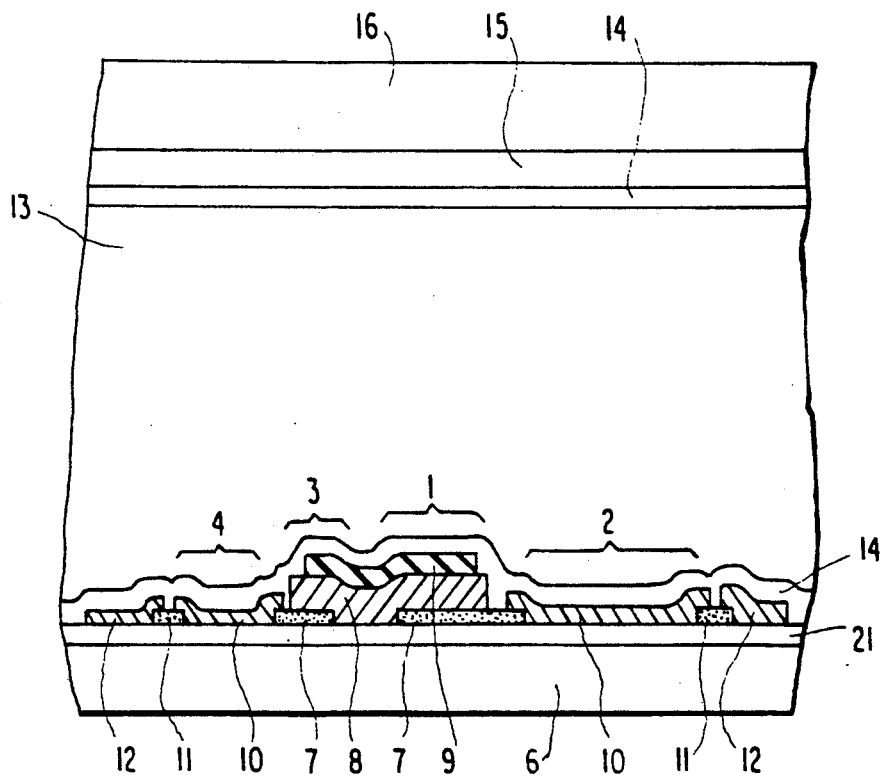
FIG. 23 is a sectional view of the MIM-LCD obtained as a third application of the second embodiment of the present invention.
Figure 24:
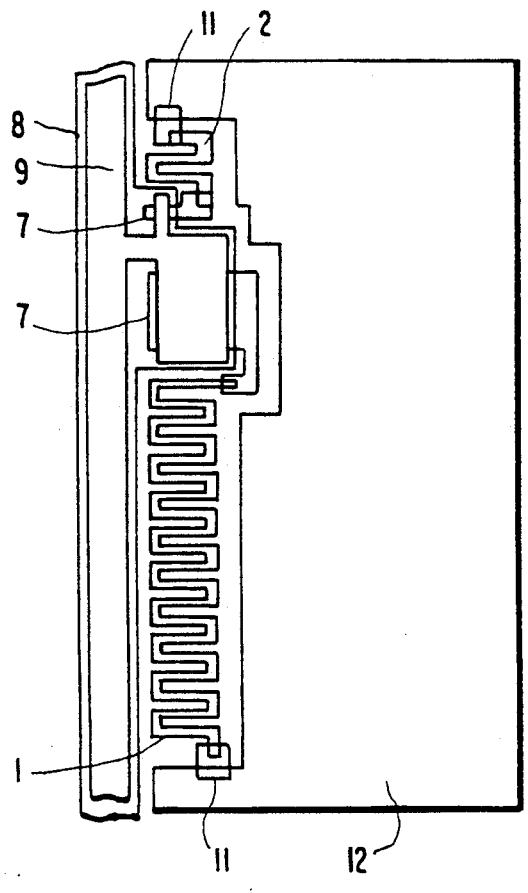
FIG. 24 is a plan view of the MIM-LCD obtained as the third application of the second embodiment of the present invention.

FIGS. 23 and 24 are a sectional view and a plan view on the lower substrate surface, respectively, of one pixel of the MIM-LCD obtained as a third application of the present embodiment. The lower glass substrate 6 is coated with a glass protective layer 21 made of SiO$_2$. This protective layer 21 may be omitted since it is not absolutely necessary. Next, a Cr film with thickness of 300 to 600 Å or so is formed as a lower electrode, and constant resistor connecting electrodes 7 which is to become the lower electrodes of an MIM element and pixel connecting electrodes 11 are formed by an ordinary photolithography method. Next, an MIM element 8 made of a silicon nitride layer with thickness of 800 to 2000 Å or so is formed by an glow discharge decomposition method that uses SiH$_4$ gas and N$_2$ gas, and a first MIM element 1 and a second MIM element 3 are patterned by a photolithography method. Following that, a Cr film with thickness of 1000 Å is formed as an upper electrode, and a lead electrode 9 is patterned by a photolithography method. At this time, the area of the overlapped portion of the lower electrode and the upper electrode which forms the element area of the second MIM element 3 is adjusted to be 1/40 to 1/20 of the element area of the first MIM element 1. Further, an ITO film with thickness of about 300 Å is formed, and a first constant resistor 2, a second constant resistor 4, which has a width equal to, and a length 1/10 to 1/5 of, those of the first constant resistor 2, and pixel electrodes 12 are formed by patterning the ITO film by the photolithography method.

An ITO film is formed on an upper glass substrate 16, and a transparent counter electrode 15 is formed by patterning the film. The lower glass substrate 6 and the upper glass substrate 16 are subjected to an orientation treatment to form oriented films 14, laminated via a spacer such as glass fiber, then sealed with an ordinary epoxy adhesive. The thickness of the cell is set to be 5 μm.

Then, a TN type liquid crystal is injected of form a liquid crystal layer 13. An MIM-LCD is completed by sealing the liquid crystal layer. After a driving of the MIM-LCD for 10,000 hours there was observed no image sticking.

Figure 25:
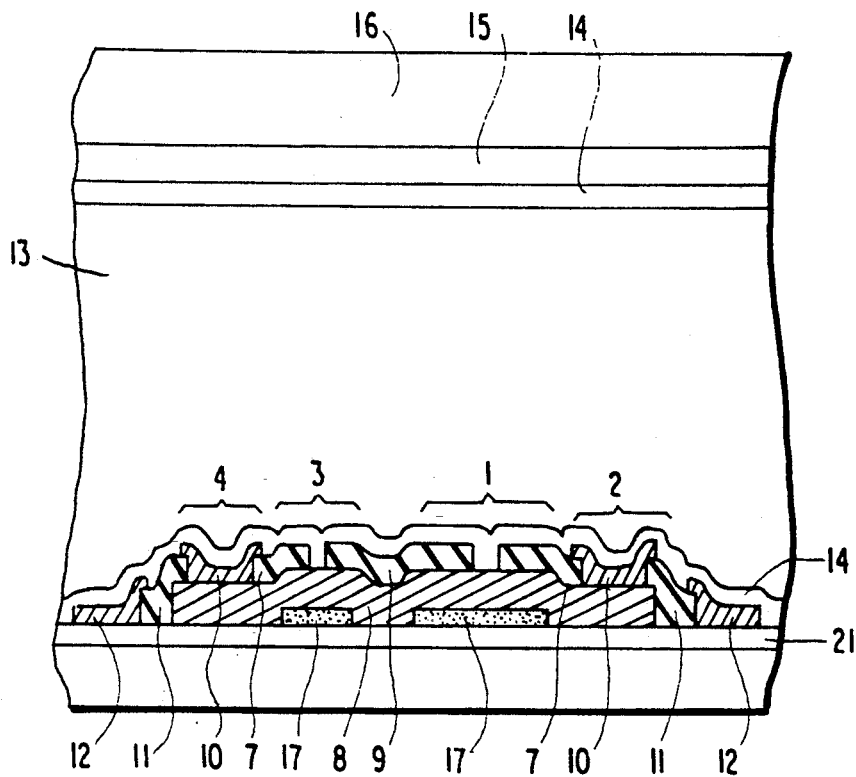
FIG. 25 is a sectional view of the MIM-LCD obtained as a fourth application of the second embodiment of the present invention.
Figure 26:
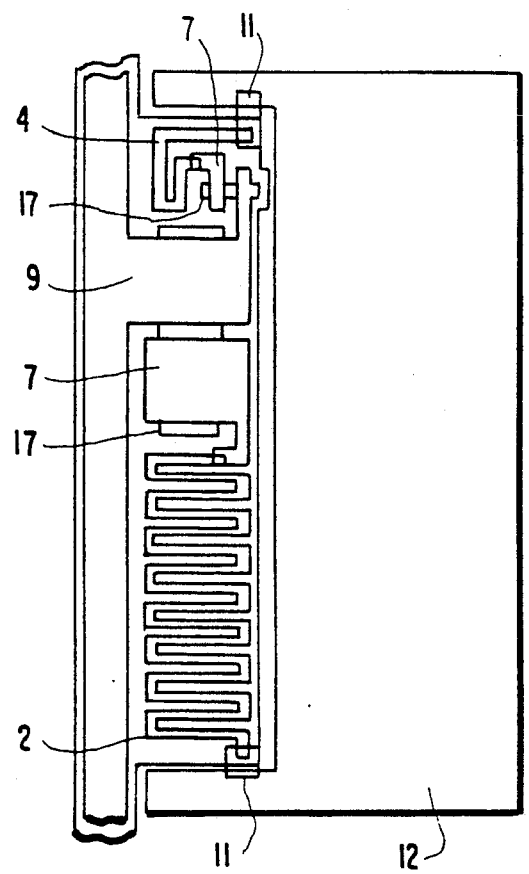
FIG. 26 is a plan view of the MIM-LCD obtained as the fourth application of the second embodiment of the present invention.

FIGS. 25 and 26 are a sectional view and a plan view on the lower substrate surface, respectively, of one pixel of the MIM-LCD obtained as a fourth application of the present embodiment. The lower glass substrate 6 is coated with a glass protective layer 21 made of SiO$_2$. This protective layer 21 may be omitted since it is not absolutely necessary. Next, a Cr film with thickness of 300 to 600 Å or so is formed as a lower electrode, and MIM element connecting electrodes 17 that are to form the lower electrodes of an MIM element are formed by an ordinary photolithography method. Next, an MIM element 8 made of silicon nitride layer with thickness of 800 to 1500 Å or so is formed by the glow discharge decomposition method that uses SiH$_4$ gas and N$_2$ gas, and a first MIM element 1 and a second MIM element 3 are patterned by an ordinary photolithography method. Following that, a Cr film with a thickness of 1000 Å is formed as an upper electrode, and a lead electrode 9, pixel connecting electrodes 11 and constant resistor connecting electrodes 7 are patterned by a photolithography method. At this time, the area of the overlapped portion of the lower electrode and the upper electrode which forms the element area of the second MIM element 3 is adjusted to be 1/40 to 1/20 of the element area of the first MIM element 1. Further, an ITO film with a thickness of about 300 Å is formed, and a first constant resistor 2, a second constant resistor 4, which has a width equal to, and a length 1/10 to 1/5 of, those of the first constant resistor 2, and pixel electrodes 12 are formed by patterning the ITO film by 9 photolithography method.

An ITO film is formed on an upper glass substrate 16 and a transparent counter electrode 15 is formed by patterning the film. The lower glass substrate 6 and the upper glass substrate 16 are subjected to an orientation treatment to form oriented films 14, laminated via a spacer such as glass fiber, then sealed with an ordinary epoxy adhesive. The thickness of the cell is set to be 5 μm.

Then, a TN type liquid crystal is injected to form a liquid crystal layer 13. An MIM-LCD is completed by sealing the liquid crystal layer. After a driving of the MIM-LCD for 10,000 hours there was observed no image sticking.

In the present embodiment, the MIM element 8 was constructed by using silicon nitride, but a similar effect can be obtained by constructing the element by using silicon carbide, silicon oxide, or the like.

It was confirmed that by the application of the present embodiment, the I–V characteristic in the range of the voltages used for graduation display be pulse width modulation, will not change even if the I–V characteristic of the MIM elements is changed due to driving of the display over a long period of time. Therefore, there will occur no sticking of the display.

Figure 27:
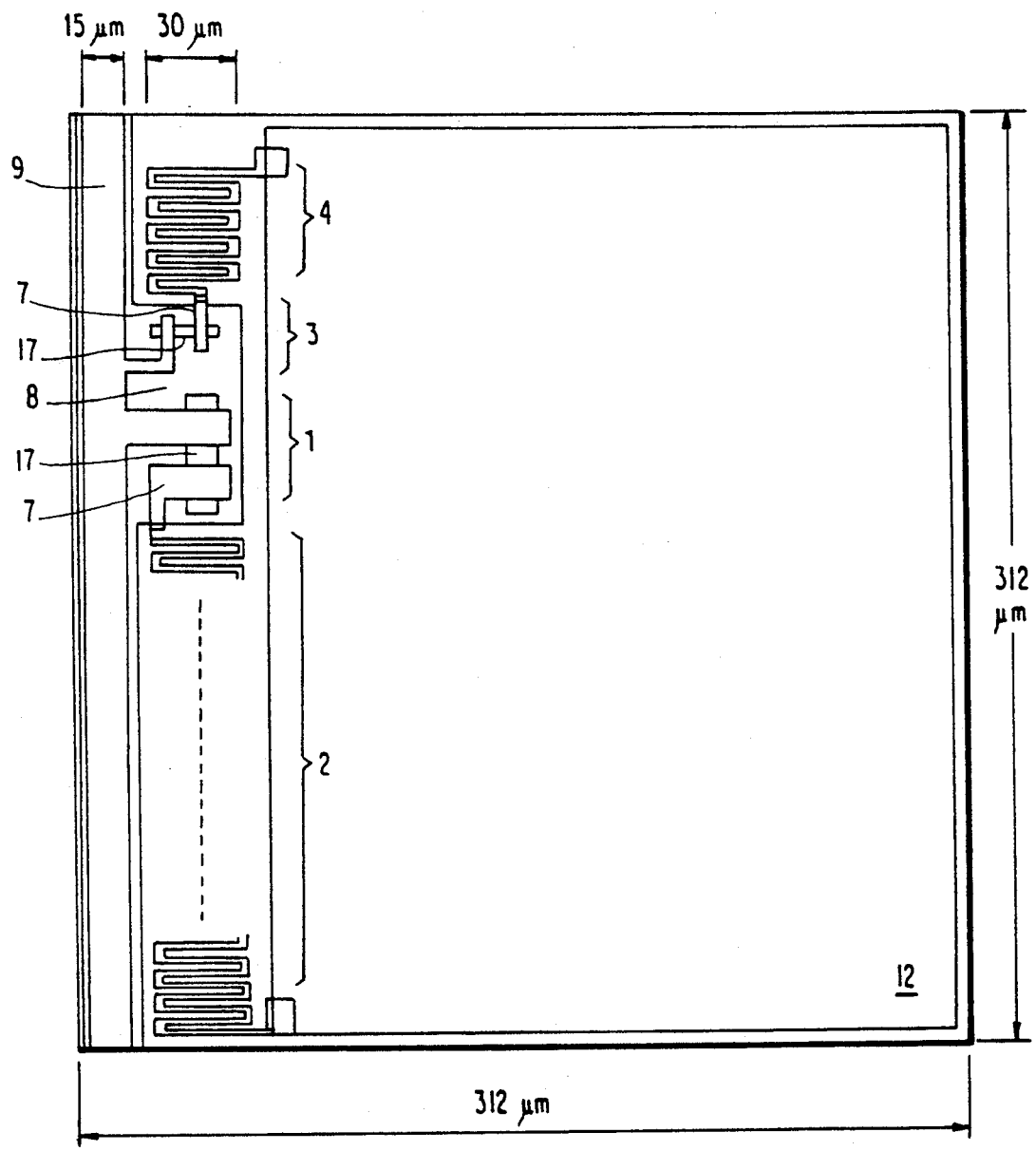
FIG. 27 is a plan view of the MIM-LCD obtained as a fifth application of the second embodiment of the present invention.
Figure 28:
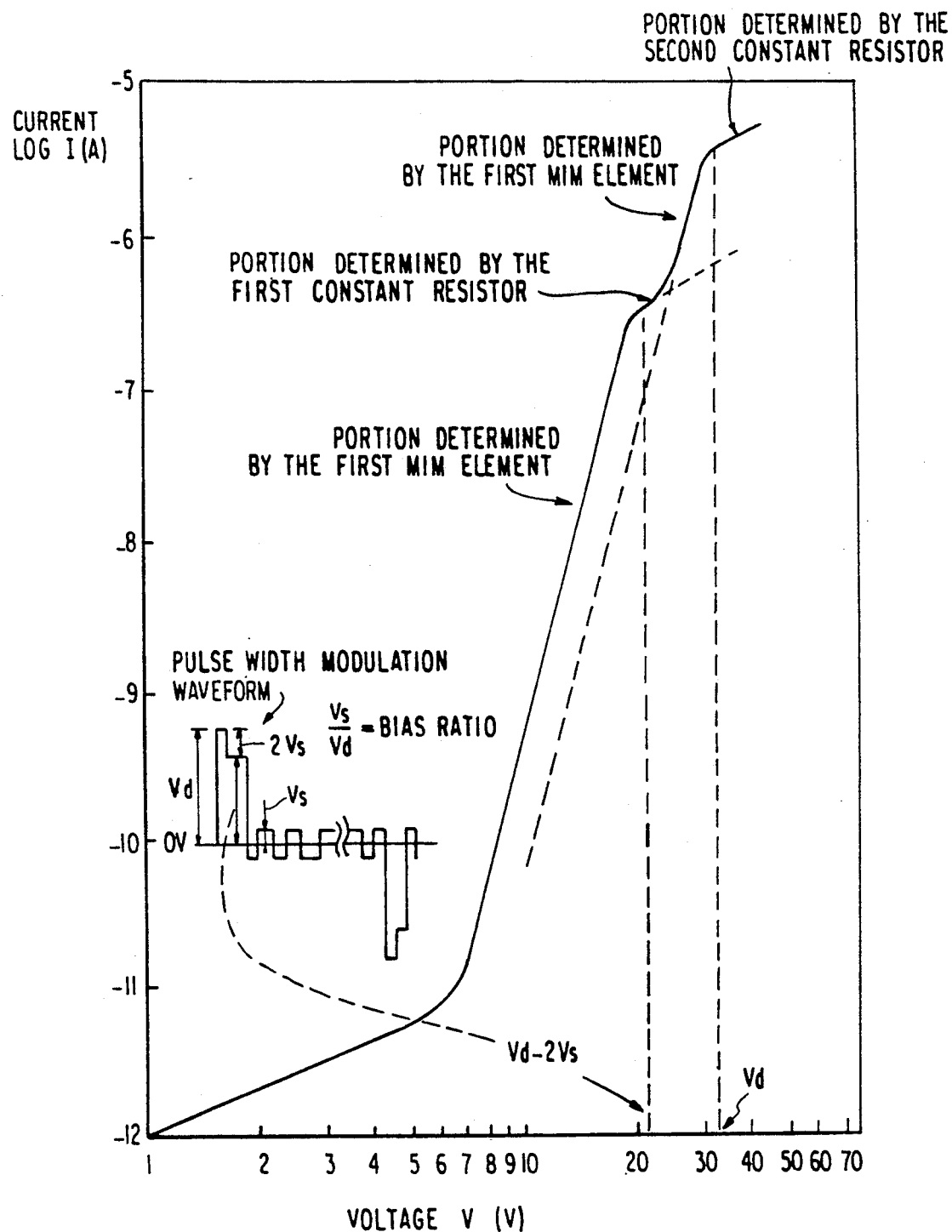
FIG. 28 is a diagram for I-V characteristic of the MIM-LCD shown in FIG. 27.

Next, an MIM-LCD as a fifth application of the present embodiment is manufactured by switching the material for the constant resistor 10 from Ta to Sb-doped $SnO_2$. A plan view of the obtained device is shown in FIG. 27. A film with a thickness of 50 Å of Sb-doped $SnO_2$ having resistivity of $5 \times 10^{-2}$ Ω. cm is formed, then by patterning the film a first constant resistor with resistance $7.3 \times 10^7$ Ω and having line width of 2 µm and length of 1470 µm, and a second constant resistor 4 with resistance $1.1 \times 10^7$ Ω and having line width of 2 µm and length of 220 µm, are formed. The I-V characteristic of the circuit consisting of a first and a second MIM elements 1 and 3, and a first and a second constant resistors 2 and 4 is as shown in FIG. 28.

What is claimed is:

1. A liquid crystal display element which has a lower substrate provided with a lead electrode and a pixel electrode, an upper substrate provided with a transparent counter electrode that opposes said pixel electrode, and a liquid crystal sandwiched between said upper and said lower substrates, said liquid crystal display element comprising: a first metal-insulator-metal element connected in series with a first constant resistor, a second metal-insulator-metal element having higher resistance than that of said first metal-insulator-metal element connected in series with a second constant resistor having lower resistance than that of said first constant resistor, the series connection of said first metal-insulator-metal element and said first constant resistor and the series connection of said second metal-insulator-metal element and said second constant resistor being respectively connected between said lead electrode and said pixel electrode.

2. The liquid crystal display element of claim 1, further including first and second lower electrodes formed above the lower substrate, a non-linear resistor formed on said lower electrodes and an upper electrode formed above the non-linear resistor, wherein portions of the upper electrode overlap portions of the first and second lower electrodes, said overlapping portions representing element areas of the first and second metal-insulator-metal elements.

3. The liquid crystal display element of claim 2, wherein an element area of said second metal-insulator-metal element equals between 1/40 and 1/20 of the element area of said first metal-insulator-metal element.

4. The liquid crystal display element of claim 1, wherein said second constant resistor has a width equal to, and a length between 1/10 and 1/5 of, the width and length of said first constant resistor.

5. The liquid crystal display element of claim 1, further including a Cr film constituting lower electrodes for the metal-insulator-metal elements, a silicon nitride layer formed above the lower substrate and completely covering the lower electrodes, and a Cr film constituting an upper electrode formed on the silicon nitride layer.

6. The liquid crystal display element of claim 5, wherein said first and second constant resistors include a Ta film patterned in a slender and meandering shape.

7. The liquid crystal display element of claim 1, wherein said pixel electrode is formed by patterning an ITO film.

8. A liquid crystal display element which has a lower substrate provided with a lead electrode, a pixel electrode, and a first metal-insulator-metal element connected between said lead electrode and said pixel electrode; an upper substrate provided with a transparent counter electrode that opposes said pixel electrode; and a liquid crystal sandwiched between said upper and said lower substrates, wherein a constant resistor is provided between said lead electrode and said pixel electrode in series with said first metal-insulator-metal element to charge said liquid crystal between said pixel electrode and said transparent counter electrode with current having a value determined by said constant resistor for the prevention of image sticking; and further including a second metal-insulator-metal element and a second resistor connected in series with said second metal-insulator-metal element, the series connection of said second metal-insulator-metal element and said second resistor being connected in parallel with the series connection of said first metal-insulator-metal element and said first resistor.

9. The liquid crystal display element of claim 8, wherein said metal-insulator-metal element is connected to said lead electrode and said constant resistor is connected to said pixel electrode.

* * * * *